(12) United States Patent
Ichinose

(10) Patent No.: US 10,796,170 B2
(45) Date of Patent: Oct. 6, 2020

(54) IMAGE INFORMATION COMPARISON SYSTEM

(71) Applicant: MITSUI KINZOKU ACT CORPORATION, Yokohama-shi, Kanagawa (JP)

(72) Inventor: Mikio Ichinose, Yokohama (JP)

(73) Assignee: MITSUI KINZOKU ACT CORPORATION, Yokohama-shi, Kanagawa (JP)

( * ) Notice: Subject to any disclaimer, the term of this patent is extended or adjusted under 35 U.S.C. 154(b) by 0 days.

(21) Appl. No.: 16/067,048

(22) PCT Filed: Sep. 5, 2016

(86) PCT No.: PCT/JP2016/075954
§ 371 (c)(1),
(2) Date: Jun. 28, 2018

(87) PCT Pub. No.: WO2017/203729
PCT Pub. Date: Nov. 30, 2017

(65) Prior Publication Data
US 2019/0073543 A1    Mar. 7, 2019

(30) Foreign Application Priority Data

May 27, 2016 (JP) ................................ 2016-105712

(51) Int. Cl.
*G06K 9/00* (2006.01)
*G08B 13/196* (2006.01)
(Continued)

(52) U.S. Cl.
CPC .......... *G06K 9/00805* (2013.01); *B60R 11/04* (2013.01); *G06K 9/00369* (2013.01); *G06K 9/6201* (2013.01); *G08B 13/19647* (2013.01)

(58) Field of Classification Search
CPC .......... G06K 9/00805; G06K 9/00369; G06K 9/6201; G08B 13/19647; B60R 11/04
See application file for complete search history.

(56) References Cited

U.S. PATENT DOCUMENTS

2003/0041329 A1* 2/2003 Bassett .................. H04N 7/185
                                                        725/105
2003/0190076 A1* 10/2003 DeLean .................. G06F 21/32
                                                        382/209
(Continued)

FOREIGN PATENT DOCUMENTS

JP     H11-296785 A    10/1999
JP     2003-058980 A    2/2003
(Continued)

OTHER PUBLICATIONS

International Search Report for PCT Application No. PCT/JP2016/075954 dated Oct. 25, 2016 in 1 page.

*Primary Examiner* — Christopher M Brandt
(74) *Attorney, Agent, or Firm* — Knobbe, Martens, Olson & Bear, LLP

(57) ABSTRACT

An image information comparison system is provided that can effectively utilize image information that is captured by an on-board camera for the purposes other than benefiting the vehicle on which the on-board camera is mounted.

Image information comparison system 1 has comparison data storage 13 that stores comparison data; on-board camera A, B, C that is mounted on a vehicle, the camera capturing an image that is external to the vehicle; data comparator 14 that compares image information that is captured by on-board camera A, B, C with the comparison data that are stored in the comparison data storage 13 based on biometric authentication technology, character recogni-
(Continued)

tion technology or image recognition technology; and reporting means 17 that report a result of comparison made by data comparator 14.

8 Claims, 1 Drawing Sheet

(51) Int. Cl.
*G06K 9/62* (2006.01)
*B60R 11/04* (2006.01)

(56) References Cited

U.S. PATENT DOCUMENTS

| | | | | |
|---|---|---|---|---|
| 2007/0139182 | A1* | 6/2007 | O'Connor | G08B 27/006 340/521 |
| 2012/0028599 | A1* | 2/2012 | Hatton | G08G 1/096716 455/404.2 |
| 2012/0140080 | A1* | 6/2012 | Taylor | B60C 23/0408 348/148 |
| 2014/0347440 | A1* | 11/2014 | Hatcher | B60R 11/04 348/36 |
| 2018/0150683 | A1* | 5/2018 | Gordon | G06K 9/00288 |

FOREIGN PATENT DOCUMENTS

| | | |
|---|---|---|
| JP | 2006-168553 A | 6/2006 |
| JP | 2006-182234 A | 7/2006 |
| JP | 2007-153193 A | 6/2007 |
| JP | 2011-105058 A | 6/2011 |
| JP | 2013-042402 A | 2/2013 |
| WO | 2013/099489 A1 | 7/2013 |

\* cited by examiner

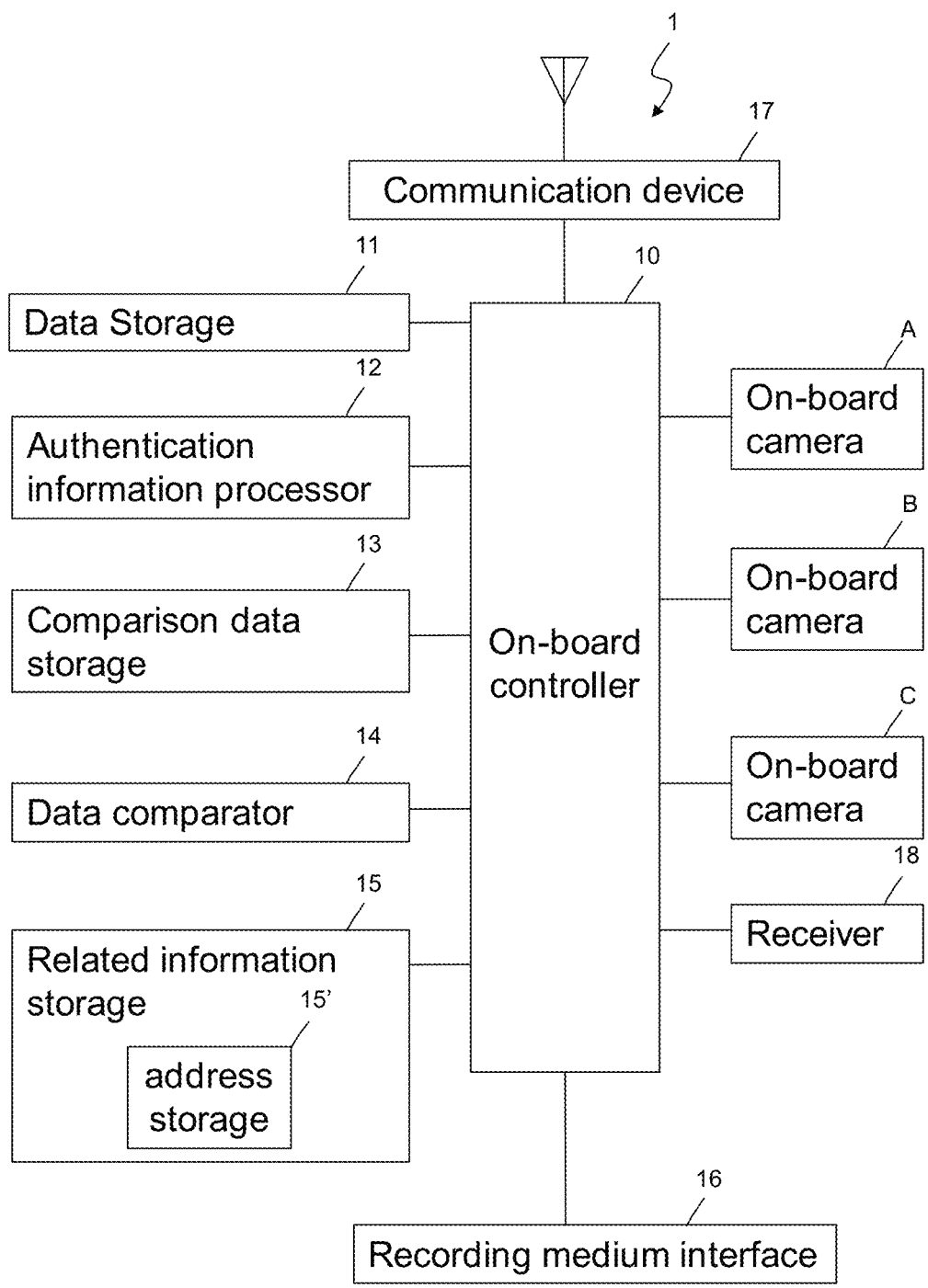

IMAGE INFORMATION COMPARISON SYSTEM

CROSS-REFERENCE TO RELATED APPLICATIONS

This application is the U.S. National Phase under 35. U.S.C. § 371 of International Application PCT/JP2016/075954, filed Sep. 5, 2016, which claims priority to Japanese Patent Application No. 2016-105712, filed May 27, 2016. The disclosures of the above-described applications are hereby incorporated by reference in their entirety.

BACKGROUND OF THE INVENTION

1. Field of the Invention

The present invention relates to an image information comparison system, and particularly to an authentication system that utilizes image information that is obtained by an on-board camera that is mounted on a vehicle.

2. Description of the Related Art

These days, various kinds of cameras are mounted on a vehicle, and the image information is used for an automatic braking system, an autonomous driving system, as well as a safety system that detects an obstacle near a vehicle door that may be an obstruction to the door when it is opened (JP2007-153193). On-board cameras used for these purposes are mounted on various parts of a vehicle that may be blind spots for the driver. The image information is mainly used for systems whose objective is to provide assistance to drivers and to reduce traffic accidents.

A system has also been developed in which a vehicle key (a radio transmitter of a remote control key or a keyless entry system) is replaced with an on-board camera. JP 2006-168553 discloses taking a picture of a person who is approaching a vehicle having an on-board camera, comparing the image information with image information that has been registered on the vehicle in advance based on biometric authentication technology, and giving permission to use the vehicle when the image information captured by the camera matches the registered information.

A system has also been proposed in which an on-board camera is used for the purpose of security or surveillance. JP 2006-182234 discloses an on-board camera that is mounted on a door mirror. When a vehicle is stopped or parked and the door mirror is retracted, the on-board camera is turned to the inside of the vehicle in order to monitor the inside of the vehicle. JP 2003-058980 discloses a system in which the license plate of a vehicle is monitored by an on-board camera that is mounted on the vehicle. Any falsification made on the license plate of the vehicle is detected based on image (character) recognition technology and is reported to the outside of the vehicle.

JP 2011-105058 discloses a multi-purpose on-board camera.

An on-board camera is also used for an event data recorder that records the driving history of a vehicle.

SUMMARY OF THE INVENTION

The on-board camera disclosed in the above patent documents is used for the purpose of driver's assistance, prevention of accidents, a substitute for a radio transmitter that is used to authenticate the owner, and security and surveillance of the vehicle. However, the on-board camera has been used solely for the benefit of the vehicle's owner.

The event data recorders, whose installation rate has been rapidly increasing recently, have image reproducing (storing) capability that are excellent in reviewing driving history when an accident occurs. However, most image information that is external to the vehicle, which is constantly captured by the on-board camera of the event data recorders, is not utilized and is disposed of or deleted by overwriting.

However, it is well anticipated that such image information that is disposed of or deleted without being utilized contains useful and highly public information, unique and valuable information and so on. Thus, based on the dramatic improvement of image processing performance, the rapid development of image analyzing technology (biometric authentication technology and character recognition technology), an increase in the storage capacity and in the transmission speed of the radio data communication, it is anticipated that a system will be developed that acquires useful and highly public information, as well as unique and valuable information, in a short time period, preferably real time, from the image information that is captured by an on-board camera and that such information can be effectively used.

The present invention aims at providing an image information comparison system that can effectively utilize image information that is captured by an on-board camera for the purposes other than benefiting the vehicle on which the on-board camera is mounted.

An image information comparison system according to the present invention comprises: a comparison data storage that stores comparison data; an on-board camera that is mounted on a vehicle, the camera capturing an image that is external to the vehicle; a data comparator that compares image information that is captured by the on-board camera with the comparison data that are stored in the comparison data storage based on biometric authentication technology, character recognition technology or image recognition technology; and reporting means that report a result of the comparison that is made by the data comparator.

According to the invention, it is possible to obtain specific image information from the situation outside of the vehicle that is captured by the on-board camera and to compare the image information with the registered comparison data based on biometric authentication technology, character recognition technology or image recognition technology, and thereby to effectively utilize an enormous amount of information that is captured by the on-board camera.

BRIEF DESCRIPTION OF THE DRAWINGS

FIG. 1 is a block diagram of the image information comparison system according to the present invention.

DETAILED DESCRIPTION OF THE INVENTION

An embodiment of the image information comparison system according to the present invention will be described with reference to the drawing. FIG.1 shows a block diagram of image information comparison system 1. Image information comparison system 1 has one or more on-board cameras A, B and C. Comparison data storage 11 is designed to receive image information that is captured by on-board cameras A, B and C.

On-board cameras A, B and C capture images that is external to the vehicle. On-board cameras A, B and C are preferably used in common with cameras that are mainly used for other purposes, such as on-board cameras for an automatic braking system or for an autonomous driving system, on-board cameras for a rear view monitoring system or on-board cameras for detecting an obstacle when a door is opened or closed. On-board cameras A, B and C may be general-purpose cameras. Alternatively, an infrared camera that is able to capture an image at night or in the dark may be used. The situation outside of the vehicle is continuously captured by on-board cameras A, B and C regardless of whether the vehicle is running or stops, and the image information is inputted to and stored in data storage 11 as authentication data by the control of on-board controller 10. The positions where on-board cameras A, B and C are mounted are not particularly limited, but may include the front part or the rear part of the vehicle, the door mirror or the side panel of the vehicle or the like.

The image information, i.e., the authentication data, that is stored in data storage 11 is then analyzed by authentication information processor 12 based on biometric authentication technology, character recognition technology or image recognition technology. The image information that is analyzed is not limited to image information that is captured when the vehicle stops. Image information that is captured when the vehicle is running may also be an object of analysis, depending on the definition of the image. In general, the authentication data have a significantly smaller data size than the original image information captured by on-board cameras A, B and C.

In the present invention, any kind of biometric authentication technology, character recognition technology and image recognition technology may be used. Thus, depending on the kind of biometric authentication technology, character recognition technology and image recognition technology, there may be major differences in the authentication step, i.e., the authentication method and the working steps. However, the data analysis that is performed by authentication information processor 12 generally means, for example, generation of the characteristic parts, such as "eye", "nose" and "lip end", in the biometric authentication. An example will be further described based on the biometric authentication.

Comparison data are stored in comparison data storage 13 of image information comparison system 1. The authentication data that are generated by authentication information processor 12 are compared with the comparison data that are registered in comparison data storage 13 by means of data comparator 14 and are biometrically authenticated. The comparison data are preferably registered in advance, but they may be registered later, as described later. Depending on the kind of biometric authentication technology, the original image information that comes from on-board cameras A, B and C may directly be compared with the comparison data, and in that case, the generation of the authentication data can be omitted.

A major characteristics of the present invention is what kind of comparison data are registered in comparison data storage 13. One preferred application is data that relate an impaired person who unknowingly wanders due to dementia (referred to as a person at risk of wandering). If a person at risk of wandering is the object, the likelihood is higher that the person will be safely protected due to on-board cameras A, B and C by registering the person's image information, as comparison data for the biometric authentication, in comparison data storages 13 of vehicles that frequently run in the person's home area or vehicles whose parking spaces are present in the person's home area.

It is desirable that the data of a person at risk of wandering be processed as comparison data and be registered in comparison data storage 13 according to the request of the person's family. Usually, digital photographic data of the person can be available. Such comparison data are associated with the person's personal information, which is registered in related information storage 15. The personal information are the address, the name, the contact information, the reporting level and so on of the person. The reporting level is a parameter that stipulates whether or not reporting is necessary when a person who matches the comparison data in the biometric authentication is found. When the reporting level is set low (for example, level 1), nothing will be done other than keeping registering the information about the person, such as when and where the person was found, in related information storage 15. When the reporting level is set high (for example, level 2), an urgent report is made upon finding the person. The reporting level may be changed according to the notification from the person's family (preferably it is changed via a communication terminal).

In the case of dementia described above, the larger the number of vehicles on which the image information comparison system 1 is mounted, the higher will be the possibility of finding the person. Accordingly, taking into consideration the protection of personal information, image information comparison system 1 is preferably mounted on vehicles of public institutions (police vehicles) or local taxis that regularly operate in the region. It is also preferable that image information comparison system 1 be mounted on vehicles of care facilities in relation to wandering. The benefit to the public of mounting the system on such vehicles is anticipated to be considerable.

The comparison data may be directly read out from a storage medium, such as a CDROM or a USB memory, via recording medium interface 16, and may be registered. The comparison data may also be registered by means of data communication via communication device 17, such as the internet or a dedicated ratio communication line.

As described above, when the authentication data that are generated by authentication information processor 12 match the comparison data that are registered in comparison data storage 13 (when biometrically authenticated), the coincidence information is sent to the person concerned, who is registered in advance, along with the information, such as the date, the time and the place, via communication device 17 (reporting means). The information of the person concerned is registered in related information storage 15. Related information storage 15 includes address storage 15' that stores the e-mail addresses of persons concerned, and the e-mail addresses are registered in address storage 15' in advance.

In the embodiment described above, substantially the entire functions of image information comparison system 1 are mounted on the vehicle, but it is also possible to install comparison data storage 13, which stores the comparison data of persons who are being searched, at a section, such as an outside security center, and to manage the data on cloud computing. The image information from on-board camera A, B, C can be transmitted to an outside security center via communication device 17 as a high definition image, as needed, due to high-speed data communication (1 Gbps, equivalent to a high-speed optical fiber communication). It is also possible to conduct the biometric authentication at the security center based on the transmitted image information. These are matters that relate to hardware, such as image processing performance, and security in data management.

Other examples of comparison data that are registered in comparison data storage 13 may include those of a person on a wanted list or a fugitive criminal, those of the license plate of a stolen vehicle or a vehicle that may be involved in a crime, and those of an infant or a school child. The comparison data of a person on a wanted list or a fugitive criminal and the comparison data of a vehicle that may be involved in a crime will usually be provided by the investigating institution. In these cases, the person concerned will include law enforcement officials in addition to a family member or a guardian. The license plate may be compared by means of character recognition technology or image recognition technology or by both these technologies. Not only the license plate of a vehicle that runs in front of or behind (given that the vehicle is provided with a rearview camera) the vehicle that is provided with the on-board camera and that runs in the same direction as the vehicle, but also the license plate of a vehicle that runs in the opposite direction can be compared. The type (model) and color of the vehicle may also be registered as comparison data. This approach is particularly effective when either the type of the vehicle or the color of the vehicle is known but the license plate number is unknown. It is also possible to register the license plate number, the type of the vehicle and the color of the vehicle and to use a part or all of this information for comparison.

For example, the global positioning system (GPS) of a cellular phone is often relied on to find the whereabouts of an infant or a schoolchild in a local or depopulated area. However, should the GPS of the cellular phone not be available, then a search for the specific person would have to be conducted by many persons based on the images of fixed-point cameras, which, however, would make a rapid search difficult. According to the present system, if the comparison data are registered in advance, authentication will be constantly carried out, the positional information will be continuously confirmed and saved, and precise information will be promptly provided in response to the request of the person concerned.

The comparison data may be registered later in data storage 11. The capacity of data storage has been dramatically increased, and an image record of a considerably long duration can be stored in the data storage, even if it is mounted on a vehicle. When data storage 11 is installed in a security center, almost a limitless amount of data can be stored. Thus, even when the comparison data are registered later, the comparison data that are registered later can be rapidly compared with the stored image information by biometric authentication technology, and useful, highly public and valuable data are expected to be rapidly available.

The comparison results may be reported not only to the outside of the vehicle but also to the vehicle itself (for example, a police vehicle) on which on-board cameras A, B, C are mounted. In this case, image information comparison system 1 is provided with on-board receiver 18, and when the image information that is captured by on-board cameras A, B, C matches the comparison data, the comparison results are reported to receiver 18. Receiver 18 may be an apparatus that generates indication, sound or voice that can be recognized by the driver or a fellow passenger, such as an indicator, a light, a speaker or a buzzer that is installed in the vehicle. The driver or a fellow passenger may find difficulty in precisely and visually confirming a person or a vehicle outside of the vehicle when the vehicle is running, but in that case, the image information that is obtained by the on-board cameras is automatically compared with the comparison data. When infrared cameras or the like that can capture images in the dark are mounted as on-board cameras A, B, C, the image information that is obtained by the on-board cameras is automatically compared with the comparison data even at night or in the dark.

BRIEF DESCRIPTION OF THE REFERENCE NUMENALS

1 Image information comparison system
10 On-board controller
11 Data Storage
12 Authentication information processor
13 Comparison data storage
14 Data comparator
15 Related information storage
16 Recording medium interface
17 Communication device
18 Receiver
A, B, C On-board camera

What is claimed is:

1. An image information comparison system comprising:
a comparison data storage that stores comparison data;
an on-board camera that is mounted on a vehicle, the camera continuously capturing an image that is external to the vehicle when the vehicle is running and stops;
a data comparator that compares image information that is captured by the on-board camera with the comparison data that are stored in the comparison data storage based on biometric authentication technology according to generation of a characteristic part or image recognition technology;
reporting means that report a result of comparison that is made by the data comparator; and
related information storage that stores a reporting level that stipulates whether or not reporting of the result of comparison is necessary,
wherein the reporting means report the result of comparison when the reporting level corresponds to a level that requires the reporting, and
the related information storage continuously records the result of comparison when the reporting level corresponds to a level that does not require the reporting.

2. The image information comparison system according to claim 1, further comprising an address storage that stores an address to which the result of comparison is reported, wherein the reporting means report the result of comparison to the address that is stored in the address storage when the image information matches the comparison data.

3. The image information comparison system according to claim 1, further comprising a receiver that is mounted in a same vehicle as the vehicle on which the on-board camera is mounted and that receives the result of comparison that is made by the data comparator, wherein the reporting means report the result of comparison to the receiver when the image information matches the comparison data.

4. The image information comparison system according to claim 1, further comprising a data storage that stores image information as authentication data, the image information being obtained by the on-board camera, wherein the data comparator compares the authentication data that are stored in the data storage with the comparison data that are newly registered in the comparison data storage based on the biometric authentication technology, according to generation of a characteristic part or the image recognition technology.

5. The image information comparison system according to claim 1, wherein the comparison data are image information of an impaired person who unknowingly wanders.

6. The image information comparison system according to claim 1, wherein the comparison data are image information that is provided by an investigating institution.

7. The image information comparison system according to claim 1, wherein the comparison data are image information of an infant or a schoolchild.

8. The image information comparison system according to claim 1, wherein the comparison data are image information of a vehicle.

* * * * *